July 25, 1967 — C. MINTZ — 3,332,398
CONTROL LEASH
Filed Jan. 26, 1966
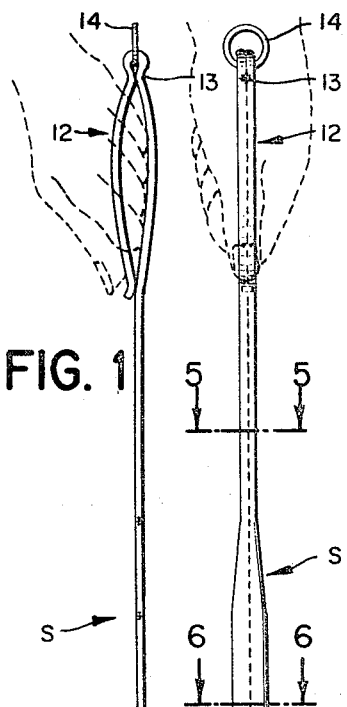
FIG. 1
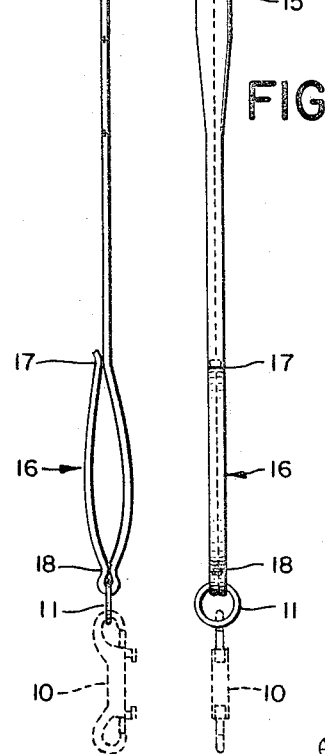
FIG. 2
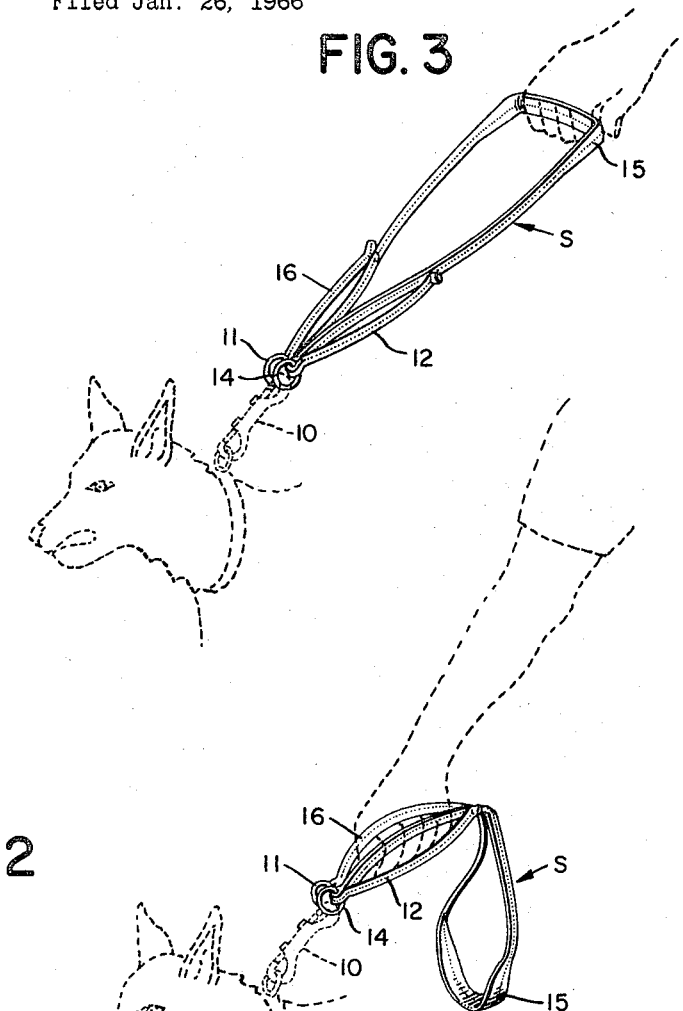
FIG. 3
FIG. 4
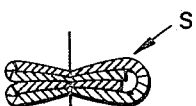
FIG. 5
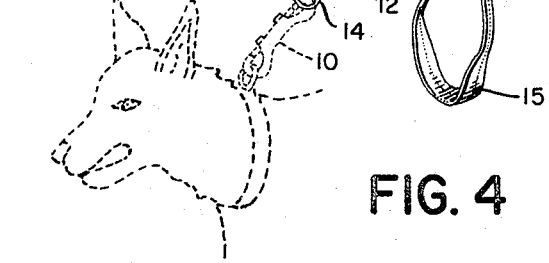
FIG. 6
INVENTOR.
Charles Mintz
BY S. Stephen Baker
ATTORNEY ABCDEFGHIJKLMNOPQRSTUVWXYZabcdefghijklmnopqrstuvwxyz0123456789
3,332,398
CONTROL LEASH
Charles Mintz, 14—15 162nd St., Whitestone, N.Y. 11357
Filed Jan. 26, 1966, Ser. No. 523,110
6 Claims. (Cl. 119—109)

This invention relates to leashes such as dog leashes or the like.

The improved leash provides superior and varied control, particularly in that it may be simply and effectively shortened as the occasion requires. Thus, in confining or restraining a large dog, for example, my invention makes it possible to reduce the leash length by one-half while actually strengthening the leash function. Further, the same advantage may be secured while effectively reducing the length substantially 100% whereby the dog may be held adjacent its neck to provide almost complete control of the dog.

The invention will be further understood from the following description and figures in which:

FIGURE 1 is an extended view of the improved leash;

FIGURE 2 is a similar view, rotated ninety degrees;

FIGURE 3 is a perspective view showing a first varied arrangement of the leash;

FIGURE 4 shows a second varied arrangement of the leash;

FIGURE 5 is an enlarged cross-sectional view as taken along the line 5—5 of FIG. 2; and FIGURE 6 is an enlarged cross-sectional view as taken along the line 6—6 of FIG. 2.

The snap hook 10 and ring 11 are conventional. The strap S is of leather or the like, which may be longitudinally stitched as illustrated if desired and is of an extended length of about 36 inches as is more or less conventional. The top end of strap S is formed with the usual hand loop 12 as by being doubled along itself and stitched, or the like. However, the extreme upper end of loop 12 is nipped and stitched at 13 to pivotally secure the top end ring 14 for a purpose to be hereinafter described.

The normal cross-section of strap S shows it to be relatively compact as illustrated in FIG. 5. However, a centralized section 15 of strap S is flared outwardly and widened (FIG. 6), for a length of about 9 inches or about one-fourth the overall-length of strap S. As will be described hereinafter, this widened section serves as an alternative handhold section when better control is desired.

Continuing downward, the strap S resumes its relatively compacted form until and including the lower end where it is formed with a lowermost loop 16 produced by doubling back the strap along itself with stitching or the like at 17. Loop 16 is nipped and stitched at 18 to secure the ring 11 in place although capable of pivotal movement.

My invention is practiced as follows:

Normally, the full length of the strap will be extended as illustrated in FIG. 1. Suppose, however, that the dog is restless and energetic, or the like. The user will then attach top ring 14 to hook 10 as illustrated in FIG. 3. This will effectively reduce the strap length in half, at the same time presenting the widened section 15 in substantially looped or U-shaped form to the user's hand as illustrated in FIG. 3. The dog is thus curbed and restrained, the strap further being strengthened by dividing the strain along both ends thereof.

Suppose further that the dog is large and aggressive, particularly should he seem intent on bounding forwardly, possibly for attacking another dog. It will be observed that the upper and lower loops 12 and 16 are substantially coincident and both may be simultaneously grasped by the user as illustrated in FIG. 4. Such action gives fullest control over the dog's movement and in most cases will effectively restain him.

It may also be noted that the loop 12 alone may be used to normally encircle the wrist, while for quick control, the same hand will grasp the loop 16, permitting the other hand to remain free for additional action.

It will be seen from the above that the improved leash provides varied controls with but the simplest of adjustments. It will be further understood that changes and omissions may be made without departing from the spirit of the invention.

What is claimed is:

1. A leash comprising a central section, and a top handhold loop at one end, a bottom handhold loop at the other end, and means on each handhold loop end to attach both ends thereof to the neck of an animal whereby both loops are substantially coincident and capable of being grasped jointly.

2. A leash according to claim 1 and wherein said leash comprises an elongated strap having a relatively widened central portion so that the leash may be alternatively grasped thereat, said widened central portion then serving as a handhold section.

3. A leash according to claim 1 and wherein said means comprises a topmost and a lowermost ring.

4. A leash according to claim 3 and wherein said leash comprises an elongated strap having a relatively widened central portion so that the leash may be alternatively grasped thereat, said widened central portion the serving as a handhold section.

5. A leash according to claim 4 and wherein said rings are nipped at the outer ends of the respective loops and stitched in place so as to be pivotally secured thereto.

6. A leash according to claim 5 and including a snap hook, said snap hook being connected to said lowermost ring whereby said top handhold loop may be slipped over the user's wrist, while his same hand may grasp said bottom handhold loop.

References Cited

UNITED STATES PATENTS

| 2,289,802 | 7/1942 | Norton | 119—109 |
| 2,333,488 | 11/1943 | Parth | 119—109 |
| 2,937,023 | 5/1960 | Seymour et al. | 119—109 |
| 3,104,650 | 9/1963 | Grahling | 119—96 |
| 3,244,149 | 4/1966 | Bosko et al. | 119—29 |

FOREIGN PATENTS

| 1,109,940 | 6/1961 | Germany. |

ALDRICH F. MEDBERY, *Primary Examiner.*